United States Patent [19]

Dec

[11] Patent Number: 5,073,148
[45] Date of Patent: Dec. 17, 1991

[54] TENSIONER WITH DAMPING SYSTEM

[75] Inventor: Andrzej Dec, Windsor, Canada

[73] Assignee: Gates Power Drive Products, Inc., Bloomfield Hills, Mich.

[21] Appl. No.: 630,592

[22] Filed: Dec. 20, 1990

[51] Int. Cl.⁵ ............................................. F16H 55/14
[52] U.S. Cl. ...................................... 474/94; 474/135
[58] Field of Search ................. 474/135, 133, 94, 139, 474/143, 164, 165, 112, 135

[56] References Cited

U.S. PATENT DOCUMENTS

| 4,472,162 | 9/1984  | Hitchcock     | 474/135 |
|-----------|---------|---------------|---------|
| 4,551,120 | 11/1985 | Thomey        | 474/135 |
| 4,583,962 | 4/1986  | Bytzek et al. | 474/135 |
| 4,689,037 | 8/1987  | Bytzek        | 474/135 |
| 4,696,663 | 9/1987  | Thomey et al. | 474/135 |
| 4,816,012 | 3/1989  | Bytzek        | 474/112 |
| 4,824,421 | 4/1989  | Komorowski    | 474/135 |
| 4,917,655 | 4/1990  | Martin        | 474/112 |

Primary Examiner—Ramon S. Britts
Assistant Examiner—Roger J. Schoeppel
Attorney, Agent, or Firm—H. W. Oberg; C. H. Castleman, Jr.; J. L. Isaac

[57] ABSTRACT

A tensioner with a pulley rotatably mounted to a pivot arm that is biased with a compression spring. The tensioner has a damping system with damping spring carried by a pin attached to the pivot arm. The damping spring is in the form of a compression spring and it presses a layer of friction material against a flat surface of the tensioner.

6 Claims, 1 Drawing Sheet

U.S. Patent  Dec. 17, 1991  5,073,148
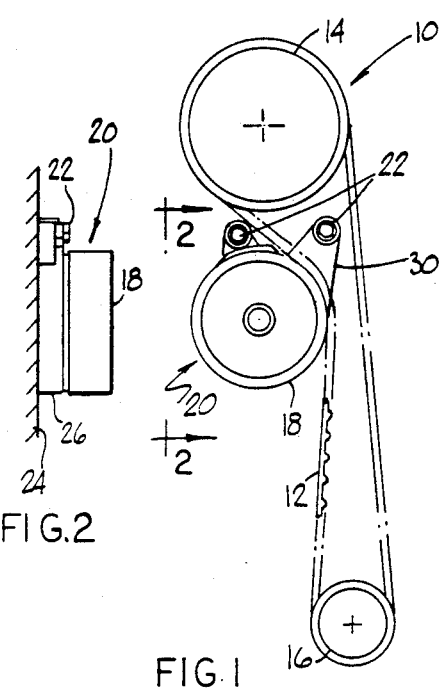
FIG.2
FIG.1
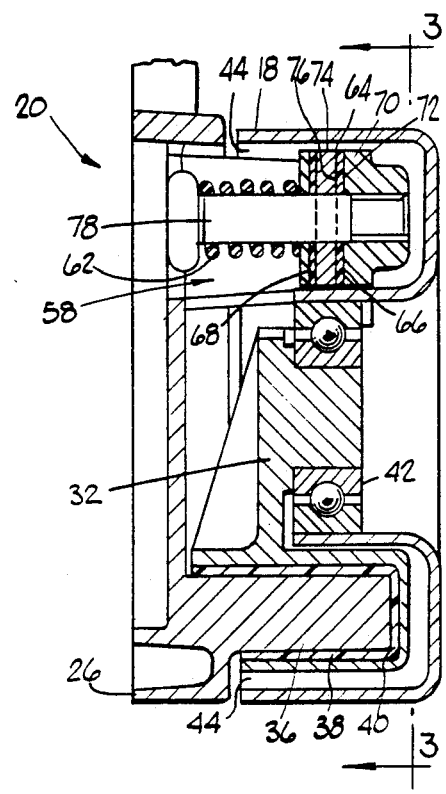
FIG.4
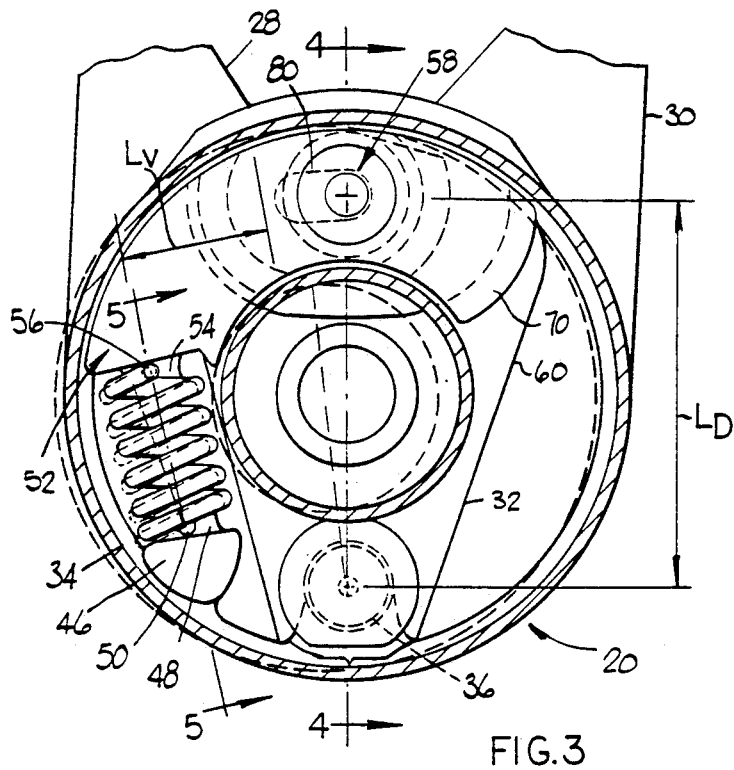
FIG.3
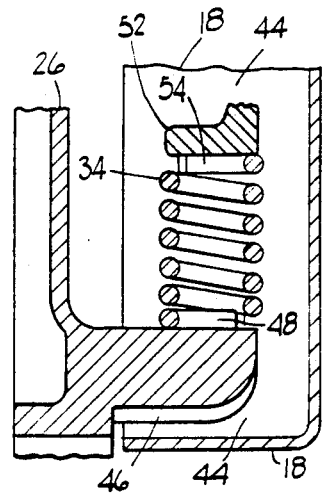
FIG.5

TENSIONER WITH DAMPING SYSTEM

BACKGROUND OF THE INVENTION

The invention relates to a tensioner for an endless power transmission member such as an endless belt, chain or the like. More particularly, the invention relates to a spring type tensioner that biases the position of a pivot arm to which a pulley is rotatably mounted. While the tensioner of the invention may be used in various applications for tensioning an endless power transmission member, it is particularly useful as a tensioner for controlling tension of a toothed belt as associated with automotive camshaft drive systems.

In an automotive camshaft drive system, a toothed or synchronous belt is entrained around pulleys that include at least two toothed pulleys. One of the pulleys is a crank pulley and the other is one or more camshaft pulleys. An idler pulley such as a backside idler pulley may be pressed against the backside of the belt to effect an installed belt tension. Many automotive drive systems use a fixed idler pulley of the eccentric type where the eccentric pivot for the pulley lies radially inward of a bearing such as radially inward of the inner race of a ball type bearing. While a fixed eccentric type pulley does not introduce tension changes because of an angular positioning of a pivot arm because the eccentric is fixed, they do introduce another type of tension problem. The problem with a fixed eccentric type pulley is that there is a change in the belt drive pulley center distance between a cold engine such as usually occurs during engine start-up in a warm or thermally expanded engine such as occurs during normal engine operating temperatures. Thus, the thermal effect is to increase belt tension with engine temperature increases, and conversely, decrease belt tension with decreases in engine temperature. A self-adjusting belt tensioner can overcome such changes in the thermal affect between a hot engine and a cold engine. Self adjusting belt tensioners require some type of damping system to inhibit oscillatory movements of the pivot arm.

An example of a self-adjusting, timing belt tensioner with a damping system is disclosed in U.S. Pat. No. 4,917,655. The tensioner is of the eccentric type and has a damping system that includes a plurality of polymeric elements circumjacently positioned at a relatively short moment arm about the pivot by an encircling spring. The amount of damping that can be effected is substantially limited because of the short moment arm. However, damping can be somewhat increased with the provision of a substantially stiffer encircling spring.

U.S. Pat. Nos. 4,551,120 and 4,696,663 show two other types of damping systems where the damping means is operative at a relatively short moment arm around the pivot axis. These types of damping systems introduce an additional problem because the damping force is dependant on or proportional their torsional, tensioning spring rate. Because of this, damping and tensioning forces can't be treated as independent variables for ease of tensioner design.

Another type of belt tensioner that offers a partial solution to the above damping system problem, is disclosed in U.S. patent application Nos. 07/588,633 and 07/588,245. In these tensioners, a leaf spring is attached to non-moving base structure and the leaf spring must have a sufficient spring leg length to accommodate all juxtaposed arcuate movements of a damping surface of the pivot arm. A problem associated with a long leg length is that it is difficult to repeatedly manufacture leaf springs having the requisite spring rates with minimum variations in spring rate over the leg length. This is because of the manner by which leaf springs are manufactured. They must be bent and the tempered and tempering may introduce uncontrolled variations in spring rates.

SUMMARY OF THE INVENTION

In accordance with the invention, a tensioner is provided that is useful in conjunction with belt drive systems and is particularly useful in a toothed belt or synchronous belt drive system such as an automotive camshaft drive. Such belt drives are often referred to as timing belt drives.

The belt tensioner of the invention is of the pivot type with a pivot arm pivotably mounted with a pivot to a base structure, and a pulley rotatably mounted to the pivot arm for engaging a belt. A first compression spring is interpositioned between a base structure and the pivot arm in such a manner to bias movement of the pivot arm. In accordance with the invention, the tensioner includes a damping system that operates to inhibit movements of the pivot arm. A second compression spring encircled around a retaining pin is carried by the pivot arm at an operative moment arm. A pad of friction material is carried by the pin and is biased by the second compression spring against a planer surface of the base.

An advantage of the invention is that the second compression spring of the damping system provides an inexpensive means for assuring provision of a repeatable damping mechanism when manufacturing a plurality of tensioners of the same design.

An object of the invention is to provide a damping system that is mechanically repeatable for producing a plurality of tensioners.

Another object of the invention is to provide a damping system where the damping may be easily and independently changed relative to the bias of a pivot arm.

These and other objects or advantages of the invention will be apparent after reviewing the drawings and description thereof wherein:

FIG. 1 is a schematic front view of a drive system that includes a belt entrained around pulleys and a tensioner of the invention;

FIG. 2 is a view taken along the line 2—2 of FIG. 1 showing a side view of the tensioner excluding the belt;

FIG. 3 is an enlarged cross-sectional view taken along the line 3—3 of FIG. 4;

FIG. 4 is a cross-sectional view taken along the line 4—4 of FIG. 3;

FIG. 5 is a partial cross-sectional view taken along the line 5—5 of FIG. 3 and further includes a superimposed partial cross-section of a pulley to show relative portioning of elements.

DESCRIPTION OF PREFERRED EMBODIMENTS

While various features of the tensioner and belt drive system are best described in conjunction with a synchronous belt drive (timing belt drive) for an automotive engine, features of the invention may also be used in other belt tensioning applications such as for automotive front-end accessory drives. Referring to FIG. 1, a synchronous belt drive system 10 is shown with a toothed belt 12 entrained and tensioned around toothed pulleys. The illustrated drive system is a camshaft drive of the automotive type that includes at least one toothed cam pulley 14, a crank pulley 16 and a tensioning pulley 18 of a tensioner 20 of the invention. The tensioner may be held in position by means of fasteners such as cap screws 22 which fasten the tensioner to an engine 24 (only partially shown).

Referring to FIGS. 2-5, the belt tensioner 20 of the invention is of the spring bias type and includes a base structure that may optionally include ears 28, 30 as a means for attaching the tensioner, a pivot arm 32 and a spring 34 biased between the base structure and pivot arm. The pivot arm 32 is pivotably mounted to the base structure by means of a pivot 36 and an optional. self-lubricating polymeric sleeve-type bearing or bushing 38 that may include a thrust cap or bearing 40.

The pulley 18 is rotatably mounted to the pivot arm such as by means of a ball bearing 42. The pulley has generally a "tube-pan" configuration that opens on an axial side to an annular space 44. The base structure has a portion such as a post 46 that protrudes into the annular space and defines a means such as a boss 48 with a slot 50 for receiving an end of the spring that includes a diametrically oriented tab.

The pivot arm has a lever arm with a length LV and portion 52 that protrudes into the annular space 44 and includes a means such as a boss 54 with a slot 56 for receiving an end portion of the spring.

The spring is a compression spring that is sized to at least partially, and more preferably substantially fit in the annular space. The spring is interpositioned between the post 46 of the base structure and portion of the pivot arm such that it is oriented substantially chordally relative to the pulley and is interconnected between the spring mounting means 48, 54.

The spring is mounted to the base structure and pivot arm so that the spring articulates with movements of the pivot arm and the moment arm LV varies in length with articulated movements of the spring in a manner as described in U.S. patent application No. 07/588,245. The moment arm shortens with a shortening of length of the compression spring and lengthens with a lengthening of the compression spring as the pivot arm is pivoted.

A damping system or means 58 is included for inhibiting movement of the pivot arm and hence, the pulley against the belt when the tensioner is in use. The damping means includes a leg or lever extension 60 of the pivot arm, a damping spring 62, a surface 64 of the base structure, and a pad of friction material 66. Optionally, a second pad of friction material 68 may be used.

The pivot arm and base are cupped to clear the pulley and are nested together juxtaposed each other in the annular space 44. A portion of the pivot arm 70 protrudes into the annular space and preferably has a planer surface portion 72. Similarly, the base structure has a damping portion 74 that protrudes into the annular space and preferably .has a flat or planer surface.

The pad of friction material 66 preferably in the form of a washer is sandwiched between the planer surfaces 72, 76. A pin type fastener such as a threaded bolt, 78 extends through a slot 80 of the base portion 76 and fastens to the pivot arm portion 70. The pin retains one end of the spring and is carried by the pivot arm as it arcuately moves about the pivot 36. The pin extends through the washer shaped pad of friction material and carries the friction material with its arcuate movements. It is preferred that the friction material be attached to the pin. For example, there may be a tight fit such as a slight interference fit between the pin and friction material so that all movements of the pivot arm are damped. If there were a clearance between the pin and friction material the pin and hence the pivot arm, could reciprocate within the clearance without effecting damping of the pivot arm. A slight press fits between the washer and pin permits the washer to slightly move in the longitudinal direction of the pin and is restricted in lateral movements relative to the pin.

More than one layer of friction pad material may be used such as a second layer or washer juxtaposed the planer base portion such that the washers are positioned juxtaposed oppositely facing planer side portions of the base structure. The pad of friction material optionally may be oblong in shape or circular to provide a sufficiently large surface for damping to take place by friction surface sliding. The friction material may be of any chosen type but it optionally may be in the form of a polymeric material such as nylon or that sold under the trademark Delrin which exhibits a starting (static) friction that is less than its sliding (dynamic) friction.

For convenience, the base structure of FIGS. 4 and 5 are shown in vertical alignment so that the relative positioning of the compression spring 34, bearing 42 and damping means 58 may be seen to be preferably aligned with each other in a substantially constant plane. Such alignment minimizes forces which must be carried by the parts as it eliminates loads that could be introduced by couples due to offsetting of the components.

To illustrate the tensioner of the invention, a tensioner was constructed with a pulley having a diameter of 104 mm and an axial face width of 36 mm. The tensioner had a total axial length of 56 mm. A compression spring having a diameter of 19 mm and a nominal compressed length of 32 mm was used for biasing the pivot arm and was chordally fit within the annular space of the generally tube-pan shaped pulley. The damping spring had a diameter of 14.7 mm and a compressed length of 18.5 mm. Two polymer washers of 24 mm diameter and 1.25 mm were tightly fit to the pin to complete the damping mechanism. When installed in a belt drive system, the tensioner operates to maintain an 80 lb. tension within a design tolerance of ±10 percent.

The foregoing detailed description is made for the purpose of illustration only and is not intended to limit the scope of the appended claims.

What is claimed is:

1. In a tensioner for tensioning a flexible power transmission member and of the type with a base structure; a pivot arm pivotably mounted with a pivot to the base structure; pulley means rotatably mounted to the base structure for engaging the power transmission member; a spring means between the base structure and pivot arm for biasing the position of the pivot arm; and means for damping movement of the pivot arm, the improvement comprising:

the pivot arm having a lever arm with a damping portion having a substantially planer surface;

the base structure with a damping portion with a substantially planer surface with a slotted aperature juxtaposed the pivot arm damping portion;

a pin attached to the pivot arm and extending through the slotted aperture;

a layer of friction material interpositioned between the pivot arm damping portion and the base damping portion;

a compression spring positioned around and retained by the pin and biasing the pivot arm damping portion, the layer of friction material, and the base structure damping portion against each other.

2. The tensioner as claimed in claim 1, wherein the layer of friction material is in the form of a flat washer and the pin extends through the washer.

3. The tensioner as claimed in claim 2, wherein there is an interference fit between the washer and pin.

4. The tensioner as claimed in claim 2 wherein the friction material is attached to and arcuately moves with the pin.

5. The tensioner as claimed in claim 2, including a second flat washer and the washers of friction material are positioned juxtaposed oppositely facing, planer side portions of the base structure and wherein the two washers are attached to and arcuately move with the pin.

6. The tensioner as claimed in claim 2, wherein the friction material is attached to the pin so that it may slightly move in the longitudinal direction of the pin and is restricted in lateral movements relative to the pin.

* * * * *